US012801624B1

(12) United States Patent
Hashtroodi et al.

(10) Patent No.: US 12,801,624 B1
(45) Date of Patent: Nov. 17, 2026

(54) CONTEXTUAL ANALYTICS FOR DATA ORIENTATION

(71) Applicant: Tableau Software, LLC, Seattle, WA (US)

(72) Inventors: Sepideh Hashtroodi, Vancouver (CA); Anna Rose Casey, Seattle, WA (US); Kevin Andrew Koji Mason, Austin, TX (US); Taylor Chandler Young, Los Angeles, CA (US); Sergey Chub, Redmond, WA (US)

(73) Assignee: Tableau Software, LLC, Seattle, WA (US)

( * ) Notice: Subject to any disclaimer, the term of this patent is extended or adjusted under 35 U.S.C. 154(b) by 329 days.

(21) Appl. No.: 17/589,814

(22) Filed: Jan. 31, 2022

(51) Int. Cl.
*G06F 16/26* (2019.01)
*G06F 16/242* (2019.01)
*G06F 16/2455* (2019.01)

(52) U.S. Cl.
CPC .......... *G06F 16/26* (2019.01); *G06F 16/2428* (2019.01); *G06F 16/24556* (2019.01)

(58) Field of Classification Search
CPC . G06F 16/26; G06F 16/2428; G06F 16/24556
See application file for complete search history.

(56) References Cited

U.S. PATENT DOCUMENTS

| | | | | |
|---|---|---|---|---|
| 9,870,389 | B2 * | 1/2018 | Elliot | G06F 3/04817 |
| 2016/0103872 | A1 * | 4/2016 | Prophete | G06Q 10/0639 707/722 |
| 2019/0095508 | A1 * | 3/2019 | Porath | G06F 16/34 |
| 2020/0174649 | A1 * | 6/2020 | Diu | G06F 3/04847 |
| 2021/0342344 | A1 * | 11/2021 | Kowolenko | G06F 16/24578 |

* cited by examiner

*Primary Examiner* — Ann J Lo
*Assistant Examiner* — Fernando M Mari Valcarcel
(74) *Attorney, Agent, or Firm* — Morgan, Lewis & Bockius LLP

(57) ABSTRACT

The various implementations described herein include methods and devices for data discovery. In one aspect, a method includes presenting a dashboard to a user, receiving a request from the user to display a data discovery window and, in response to the request, displaying the data discovery window while continuing to present the dashboard, where the data discovery window contains information about the dashboard. The method further includes, while displaying the data discovery window, receiving a user selection of an element in the dashboard, and, in response to the user selection, updating the data discovery window to contain information about the element.

20 Claims, 13 Drawing Sheets

100

100

100

100

CONTEXTUAL ANALYTICS FOR DATA ORIENTATION

TECHNICAL FIELD

The disclosed implementations relate generally to data analytics and more specifically to systems, methods, and user interfaces that enable users to explore data within a data analytics application.

BACKGROUND

Data analytics applications enable a user to understand a data set visually, including distribution, trends, outliers, and other factors that are important to making business decisions. Some data sets are very large or complex and include many data fields. Various tools can be used to help understand and analyze the data, including dashboards that have multiple data visualizations. However, some functionality may be difficult to use or hard to find within a complex user interface.

SUMMARY

Data discovery generally has two goals: to assist users in understanding the data they are currently engaged with, and to assist users with understanding what additional analytical paths are possible. One way to articulate these goals is to present them as the questions, “Where am I?” and “Where can I go next?” These are not necessarily independent aspects of orienting to data, as there is a dependent relationship between them. The understanding of where users are impacts their understanding of the realm of possible next steps. Stated another way, understanding the data users are currently engaged with will impede or enable their ability to understand additional analytical paths with the data.

Orienting to data is a first step that users who engage with data should accomplish in order to accomplish many other analytical tasks. This is true for a user’s first use and continued use of data. This is an underserved need in all contexts and the present disclosure describes solutions that accelerate this necessary, but time-consuming process, of orienting to data. Business users in particular may experience the negative consequences of a gap in tools and features designed to support orienting to data and may not be able to troubleshoot this lack due to lower data literacy and tool skills.

The present disclosure describes on-demand components to support data and analytics workflows that can be called up by user at any time in analysis. An example is a discovery window (or pane) that can be presented along with a visualization dashboard or workbook. The discovery window may include customizable content for any object in the dashboard, such as a field description, a formula or calculation, a summary, and/or a data relationship map.

In accordance with some implementations, a method is performed at an electronic device. The method includes presenting a dashboard to a user and receiving a request from the user to display a data discovery window. The method further includes, in response to the request, displaying the data discovery window while continuing to present the dashboard, where the data discovery window contains information about the dashboard. The method also includes, while displaying the data discovery window, receiving a user selection of an element in the dashboard; and, in response to the user selection, updating the data discovery window to contain information about the element.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors, memory, and a display. The one or more programs include instructions for performing any of the methods described herein.

Thus, methods, systems, and graphical user interfaces are disclosed that enable users to discover and orient on data. Such methods may complement or replace conventional methods for discovering and orienting on data

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

Figure 1:
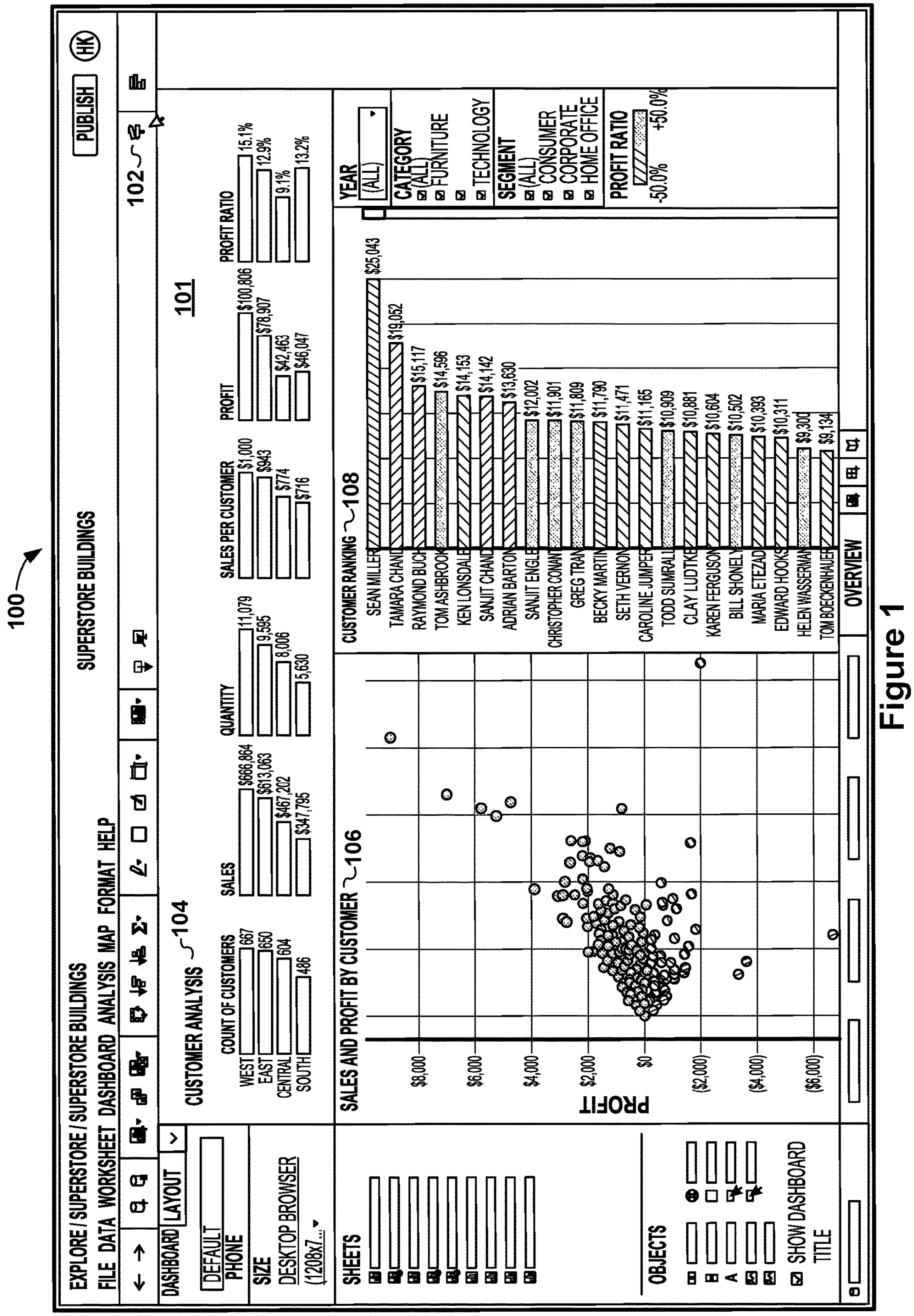
FIG. 1 illustrates an example graphical user interface in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Business users and viewers of data dashboards struggle with orienting to the data contents. Users who have not oriented to the data contents may be uncertain about scope of the data and possibilities for analysis. They may lack context and have ambiguity about the meaning of the data. They may also have an inability to map the data to its real-world implications. These deficiencies can result in a lack of trust in the data visualizations and metrics, incorrect interpretations of the data, exportation of the data to other applications and programs, and/or abandonment of the data dashboards.

The data orientation and discovery systems and methods in the present disclosure help users to: (i) understand the purpose and context of the dashboard, (ii) learn how the different elements of dashboard interact with each other, and (iii) build trust and confidence by looking at the provided contextual data.

For example, a discovery pane of the present disclosure may be provided that allows for a dashboard author to embed their descriptive videos so as to help users understand the context and relevance of the dashboard. The discovery pane may also make the metadata more visible to viewers and provide them with more context about the dashboard. The discovery pane may provide a single location (source) for viewers of dashboard to look to for more contextual information about the dashboard or its elements. The discovery pane may also provide timely information that allows users to establish the relevance of the data to their questions, trust in the data, and have confidence in their understanding and interpretation of the data.

For example, the discovery pane for a dashboard may include the following components: the dashboard name, linked audio or visual resources created or approved by the dashboard author, a description field, metadata about the dashboard owner and/or author, an interaction overlay toggle for the dashboard, information about the data sources used in the dashboard, and information about users and number of views for the dashboard. In this example, selection of (e.g., clicking on) a discovery pane component, such as a data source, allows the user to "drill down" to view discovery information about that component within the discovery pane.

In this way, the discovery pane of the present disclosure allows users to see data in a familiar layout as a way to bridge their current understanding of the tabular data with visual representations of data. In some situations, the discovery pane helps users: (i) build a mental model of underlying data tables and relationships between elements within data (e.g., data sources, objects, tables, fields, marks, and records); (ii) access context around data from experts within their organizations; and (iii) build trust in metrics and visualizations by allowing users to inspect underlying records and relationships.

Turning now to the figures, FIG. 1 illustrates a graphical user interface 100 in accordance with some implementations. In some implementations, the graphical user interface 100 is for a data analysis or data visualization application. The graphical user interface 100 includes a dashboard 101. In the example of FIG. 1, the dashboard 101 includes a customer analysis visualization 104, a sales and profit by customer visualization 106, and a customer ranking visualization 108. The dashboard 101 also includes a data discovery affordance 102 (e.g., a selectable icon).

Figure 2A:
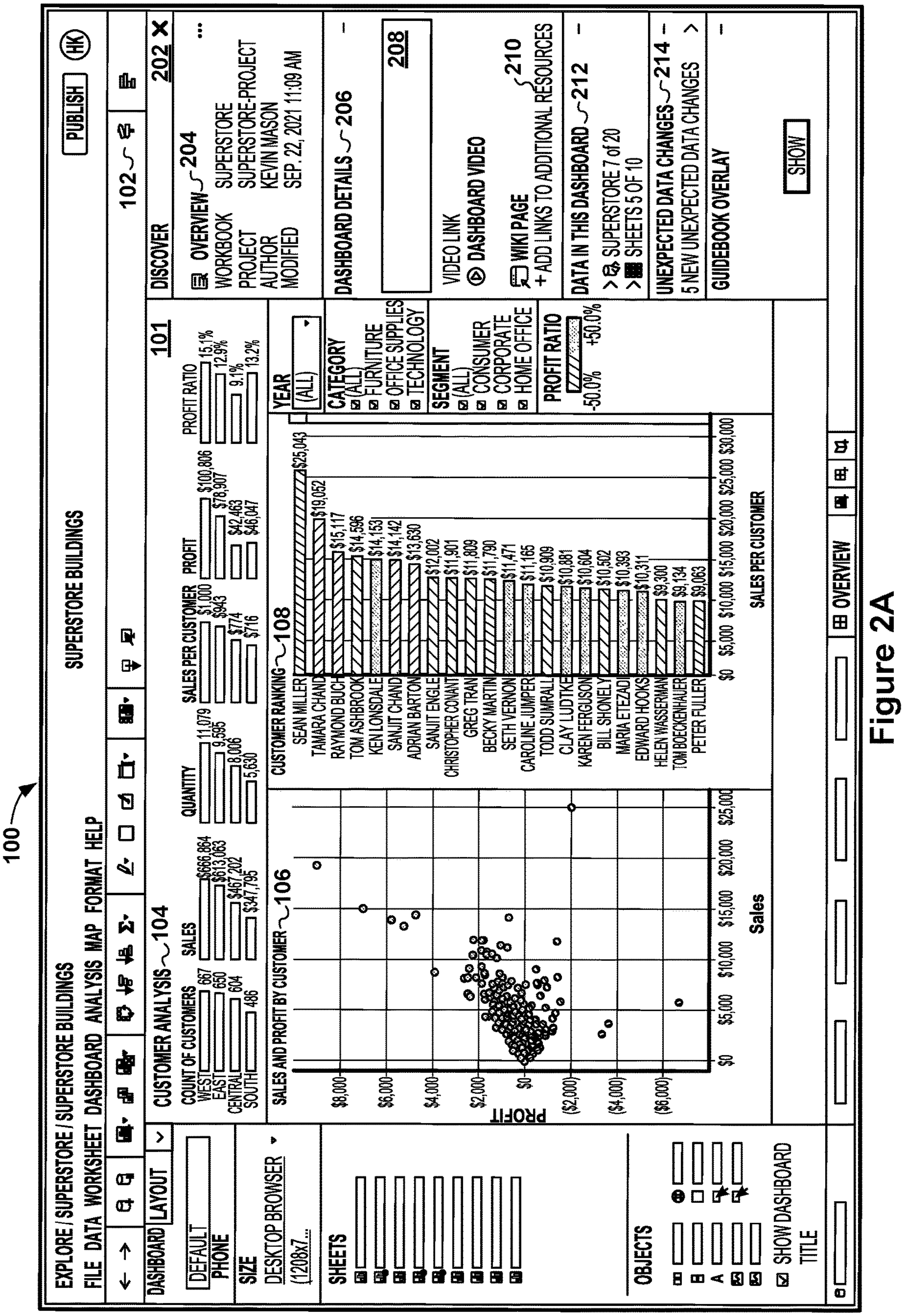
FIGS. 2A-2E illustrate example user interactions with the example graphical user interface of FIG. 1 in accordance with some implementations.

FIGS. 2A-2E illustrate example user interactions with the graphical user interface 100 in accordance with some implementations. FIG. 2A shows the graphical user interface 100 having a discovery pane 202. In some implementations, the discovery pane 202 is a separate window or overlay from the dashboard 101. In some implementations, the discovery pane 202 is located on a different side of the dashboard 101, e.g., is positioned to the left, below, or above the dashboard 101. In some implementations, the discovery pane 202 is displayed in response to a user selection of the data discovery affordance 102. The discovery pane 202 in FIG. 2A shows discovery information about the dashboard 101, e.g., because no element of the dashboard 101 is selected. The discovery pane 202 includes multiple sections, e.g., the overview section 204, the dashboard details section 206, the dashboard data section 212, and the data changes section 214. In some implementations, the discovery pane 202 includes a single section. In some implementations, the discovery pane 202 includes additional sections, such as a visualizations section for showing information about visualizations used in the dashboard 101.

The overview section 204 includes information about the workbook, the project, the author, and the modification date in accordance with some implementations. In some implementations, the overview section 204 includes other general information about the dashboard, such as the current owner and the creation date. The dashboard details section 206 includes a description field 208, links to audio and/or visual resources, and an affordance 210 for adding additional links. In some implementations, the dashboard details section includes other information from a dashboard author or owner, such as a purpose, summary, or revisions field. The dashboard data section 212 includes information about the data source(s) and sheets used by the dashboard. The data changes section 214 includes information about data changes in the data used by the dashboard 101.

Figure 2B:
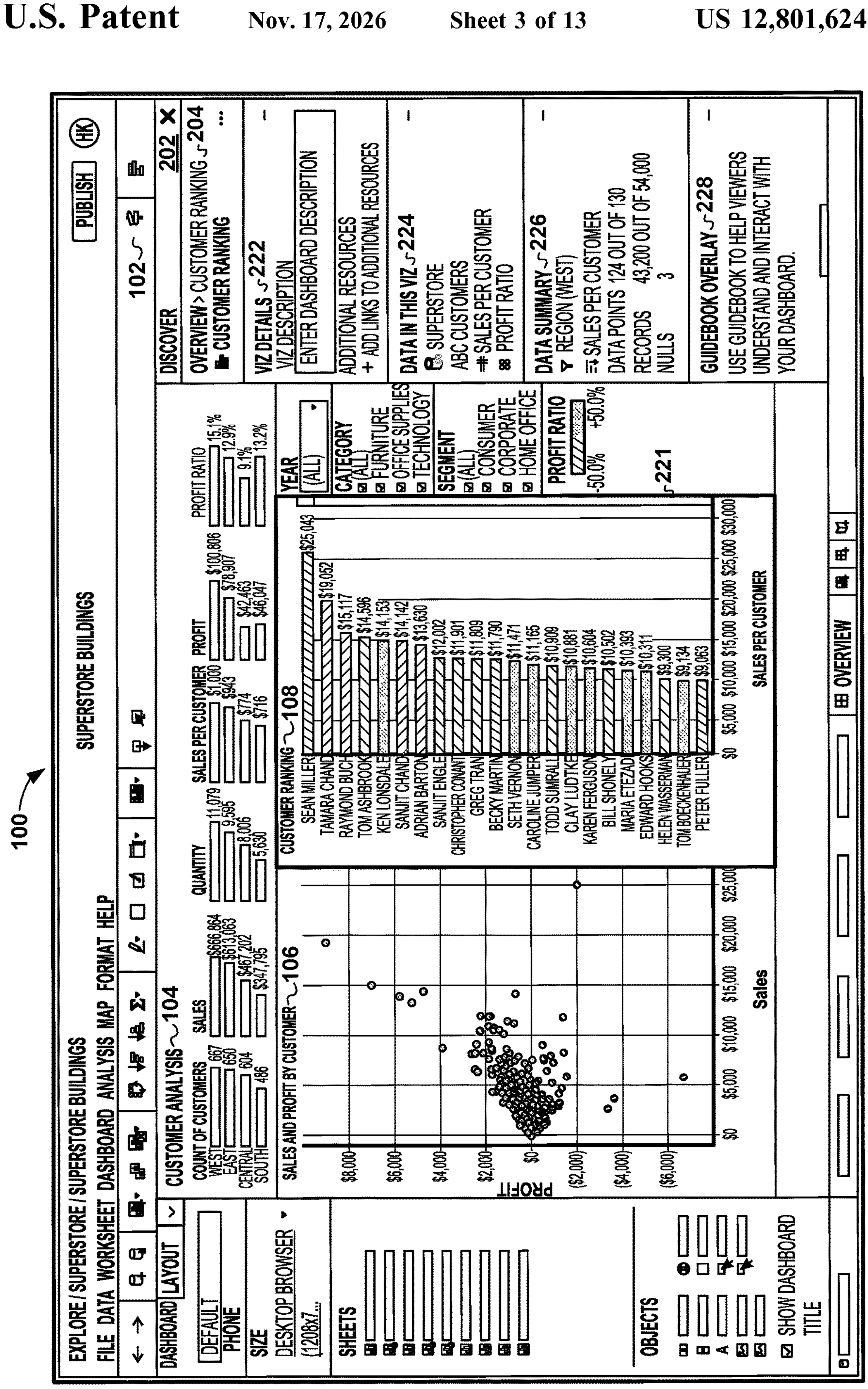

FIG. 2B shows the graphical user interface 100 with the discovery pane 202 in accordance with some implementations. In FIG. 2B, the customer ranking visualization 108 is selected, as denoted by the emphasis 221. In accordance with the selection of the customer ranking visualization 108, the discovery pane 202 is updated to show discovery information about the customer ranking visualization 108. The discovery pane 202 in FIG. 2B includes the overview section 204, a visualization details section 222, a visualization data section 224, a data summary section 226, and a guidebook section 228. The overview section 204 in FIG. 2B includes a hierarchy indicator (e.g., breadcrumbs) for the current view of the discovery pane 202. The visualization details section 222 includes a description field and additional resources for the customer ranking visualization 108. The visualization data section 224 includes information about the data source and data fields used in the visualization. The data summary section 226 includes information about data filters applied to the visualization, a rank/sort applied to the visualization, data points in the visualization, and records used in the visualization. The data summary section 226 also includes an indication of a number of null values in the visualization. The guidebook section 228 includes information about an interaction overlay and an affordance for activating the interaction overlay in accordance with some implementations.

Figure 2C:
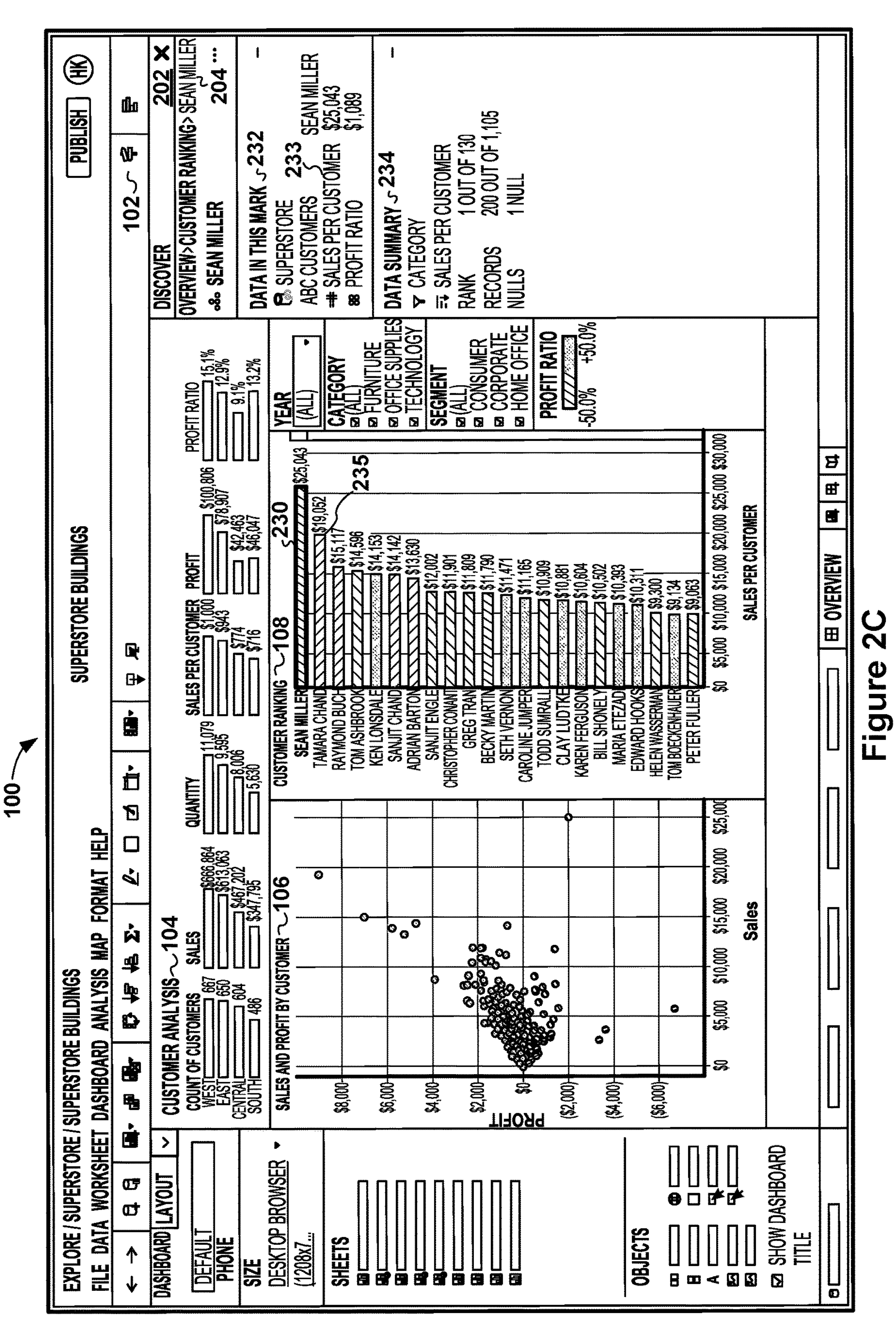

FIG. 2C shows the graphical user interface 100 with the discovery pane 202 in accordance with some implementations. In FIG. 2C, the Sean Miller mark 230 is selected, as denoted by the bold emphasis. In accordance with the selection of the Sean Miller mark 230, the discovery pane 202 is updated to show discovery information about the Sean Miller mark 230. The discovery pane 202 in FIG. 2C includes the overview section 204, a mark details section 232, and a data summary section 234. The overview section 204 in FIG. 2C includes a hierarchy indicator (e.g., breadcrumbs) for the current view of the discovery pane 202 (e.g., the Sean Miller mark 230). The mark details section 232 includes information about the data source and data fields used in the mark, such as the sales per customer field 233. The data summary section 234 includes information about data filters applied to the visualization, a rank/sort applied to the visualization, the rank of the mark in the visualization, records with the mark (versus records in the visualization), and the number of null values.

Figure 2D:
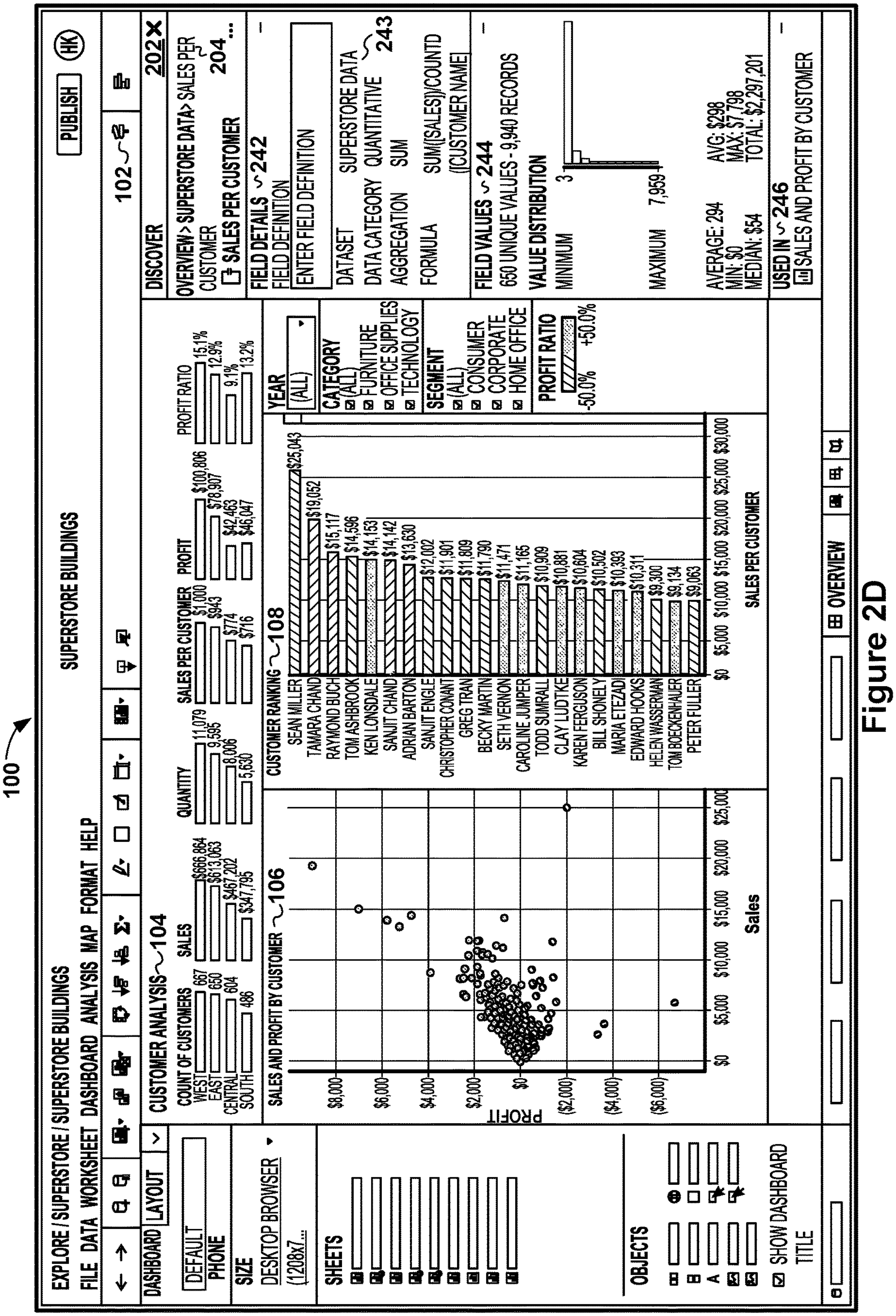

FIG. 2D shows the graphical user interface 100 with the discovery pane 202 in accordance with some implementations. In FIG. 2D, the sales per customer field 233 is selected, e.g., selected from the discovery pane shown in FIG. 2C. In accordance with the selection of the sale per customer field 233, the discovery pane 202 is updated to show discovery information about the sales per customer field 233. The discovery pane 202 in FIG. 2D includes the overview section 204, a fields details section 242, a field values section 244, and a usage section 246. The overview section 204 in FIG. 2D includes the hierarchy indicator for the current view of the discovery pane 202 (e.g., the sales per customer field 233). The field details section 242 includes a field definition box, information about the dataset, the data category, the aggregation type, and the formula used for the field. The field values section 244 includes information about the number of unique values and records, the value distribution, and value statistics. The usage section 246 includes a list of visualizations in the dashboard that use the sales per customer field 233.

Figure 2E:
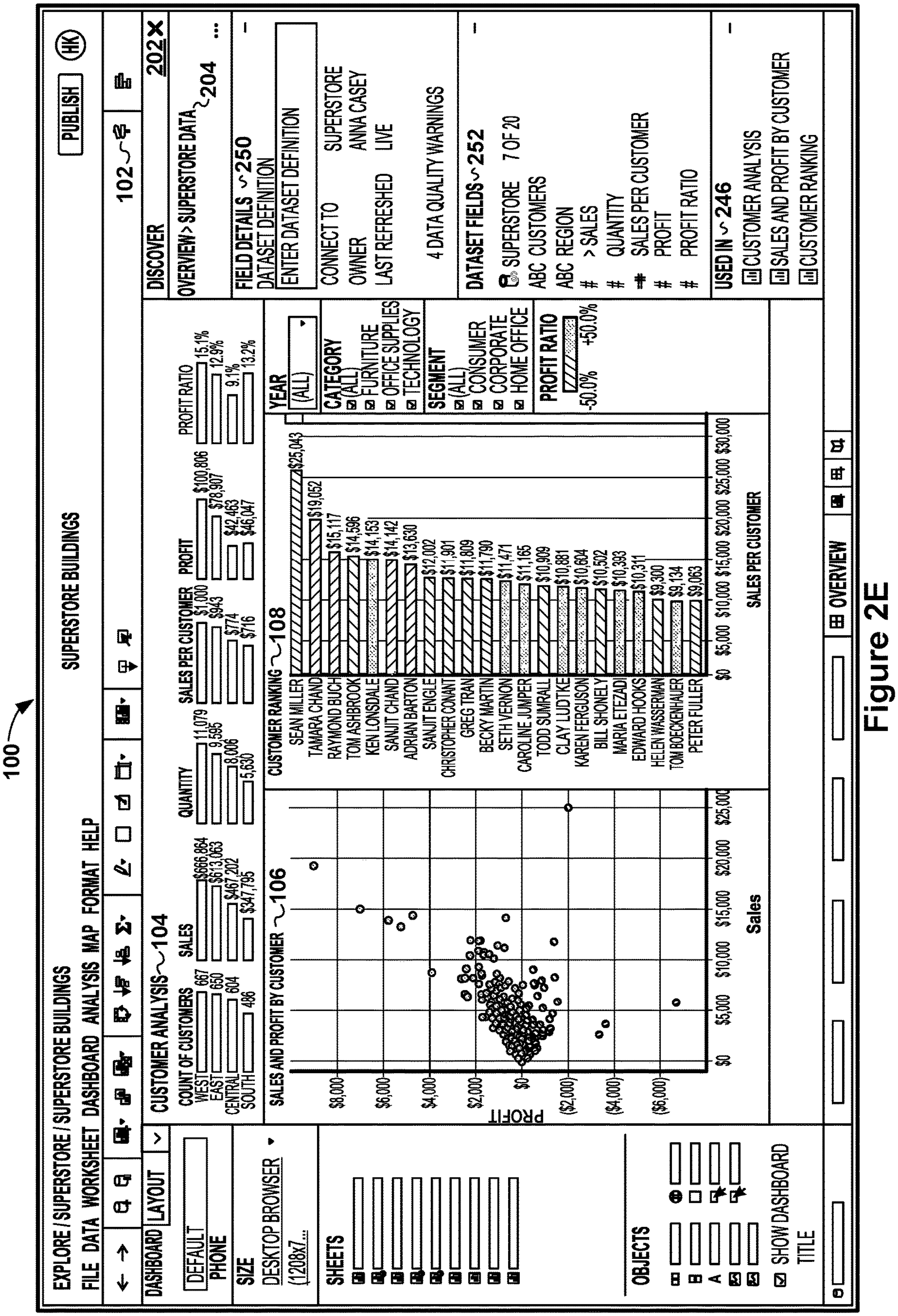

FIG. 2E shows the graphical user interface 100 with the discovery pane 202 in accordance with some implementations. In FIG. 2E, the superstore dataset 243 is selected, e.g., selected from the discovery pane shown in FIG. 2D. In accordance with the selection of the superstore dataset 243, the discovery pane 202 is updated to show discovery information about the superstore dataset 243. The discovery pane 202 in FIG. 2E includes the overview section 204, a dataset details section 250, a dataset fields section 252, and the usage section 246. The overview section 204 in FIG. 2E includes the hierarchy indicator for the current view of the discovery pane 202 (e.g., the superstore dataset 243). The dataset fields section 252 includes a dataset definition box, information about the database connection, owner, refresh date, and data quality. The dataset fields section 252 includes information about the database and fields used in the dashboard 101. The usage section 246 includes a list of visualizations in the dashboard that use the superstore dataset 243.

Figure 3:
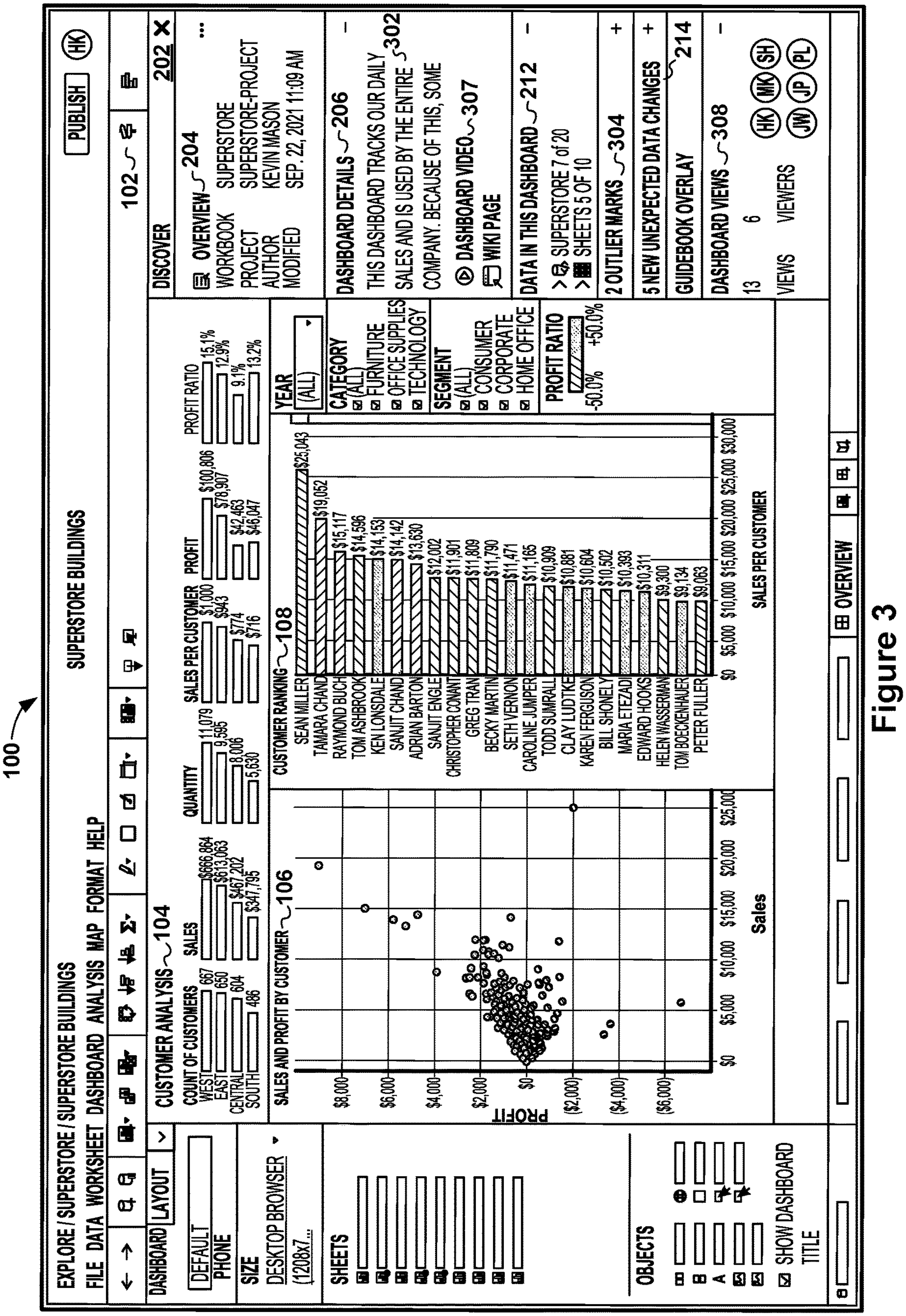
FIG. 3 illustrates an example graphical user interface in accordance with some implementations.

FIG. 3 illustrates the graphical user interface 100 in accordance with some implementations. FIG. 3 shows the graphical user interface 100 having a discovery pane 202. In some implementations, the discovery pane 202 is displayed in response to a user selection of the data discovery affordance 102. The discovery pane 202 in FIG. 3 shows discovery information about the dashboard 101, e.g., because no element of the dashboard 101 is selected. The discovery pane 202 includes the overview section 204, the dashboard details section 206, the dashboard data section 212, and the data changes section 214. The discovery pane 202 in FIG. 3 also shows an outlier section 304 and a views section 308. The dashboard details section 206 in FIG. 3 includes a dashboard description 302 and a linked dashboard video 307, and is not editable by the user. In accordance with some implementations, the dashboard details section 206 in FIG. 2A corresponds to a user having edit privileges for the dashboard (e.g., is an author or owner of the dashboard) whereas the dashboard details section 206 in FIG. 3 corresponds to a user not having edit privileges for the dashboard (e.g., only has read privileges). The outlier section 304 is collapsed in FIG. 3 and includes information about marks that are outliers in the dataset. The data changes section 214 is also collapsed in FIG. 3. The views section 308 includes information about a number of views for the dashboard and a number of unique viewers of the dashboard.

Figure 4:
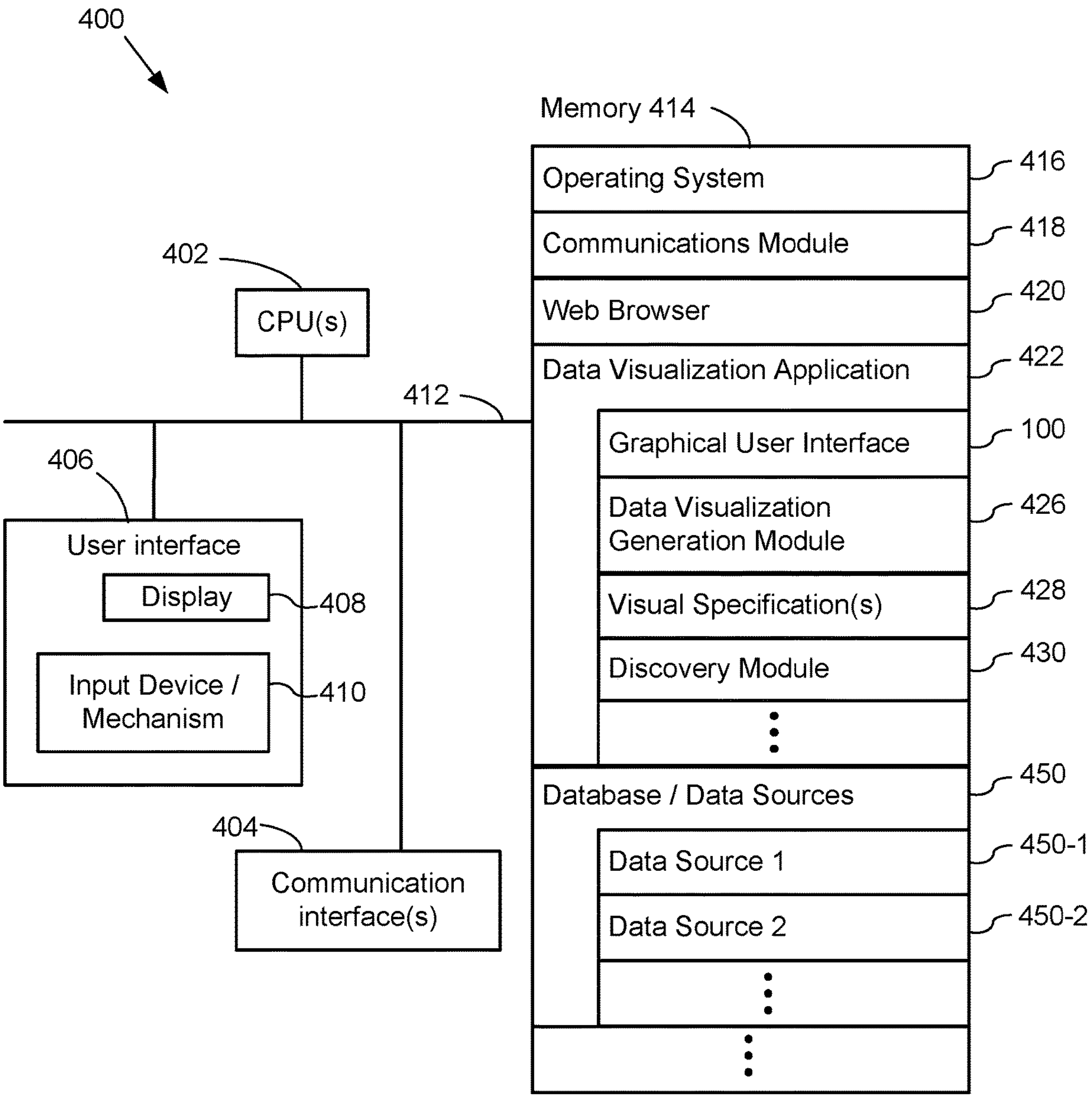
FIG. 4 is a block diagram of an example computing device in accordance with some implementations.
Figure 5A:
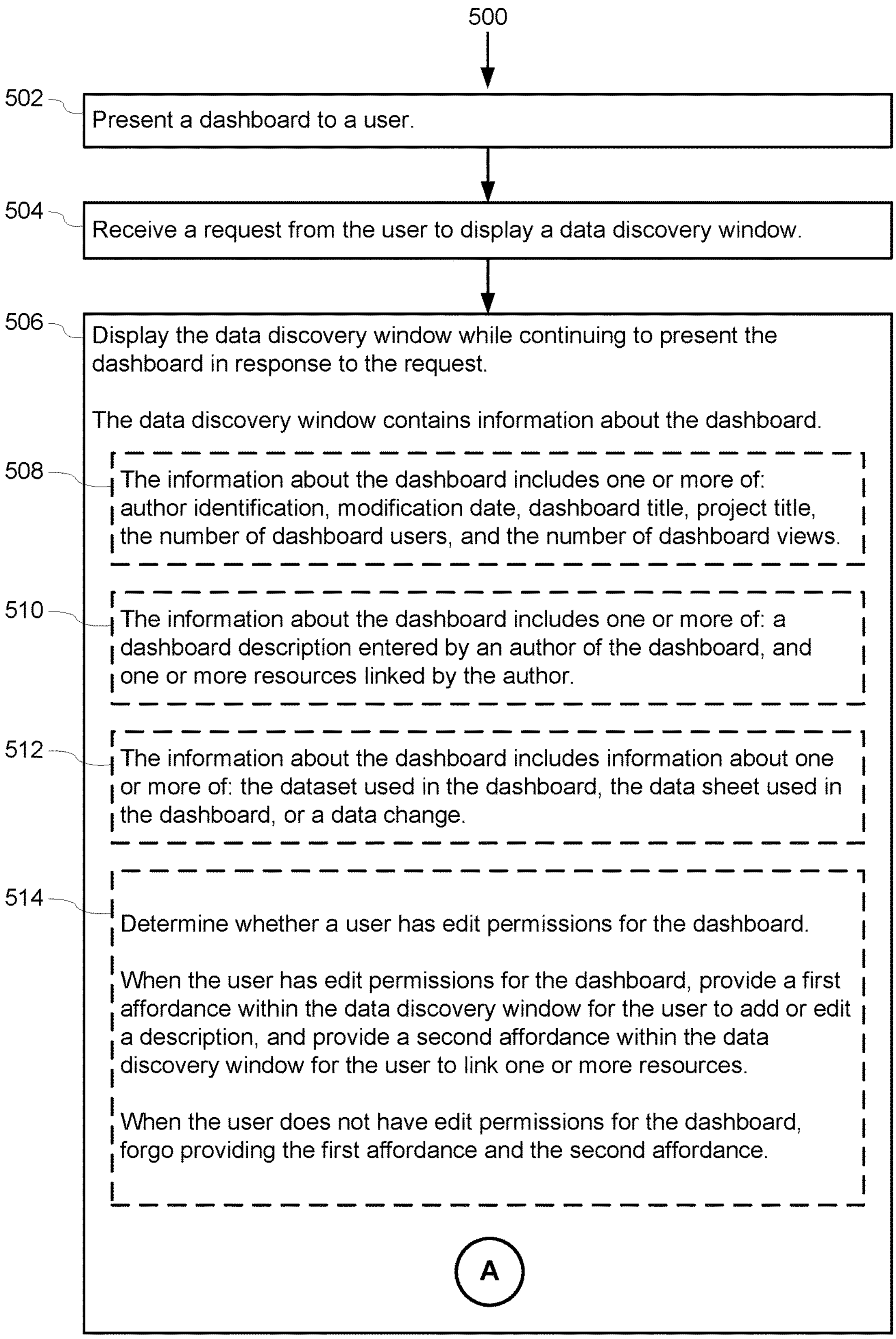
FIGS. 5A-5E provide a flowchart of an example process for data exploration in accordance with some implementations.
Figure 5B:
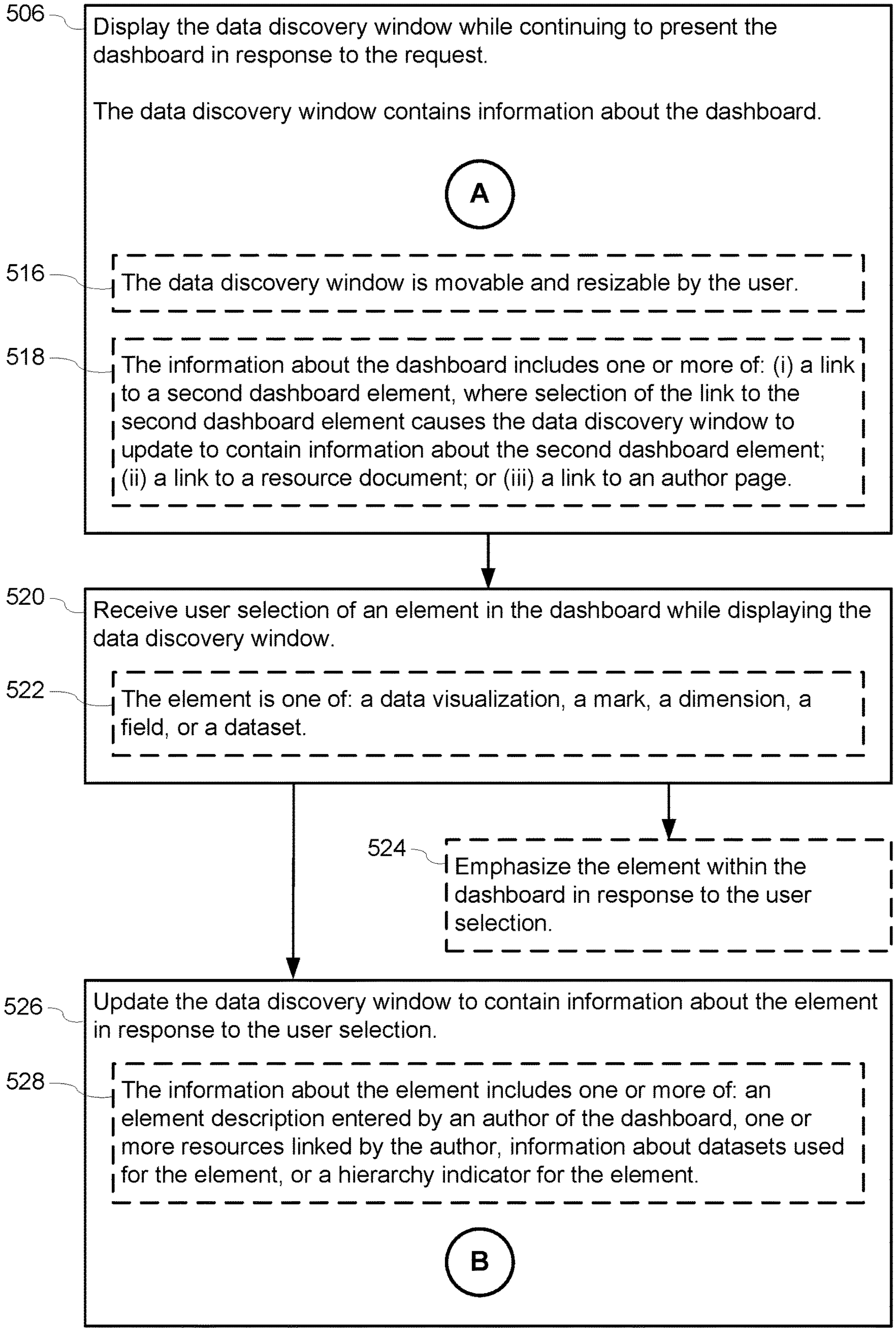
Figure 5C:
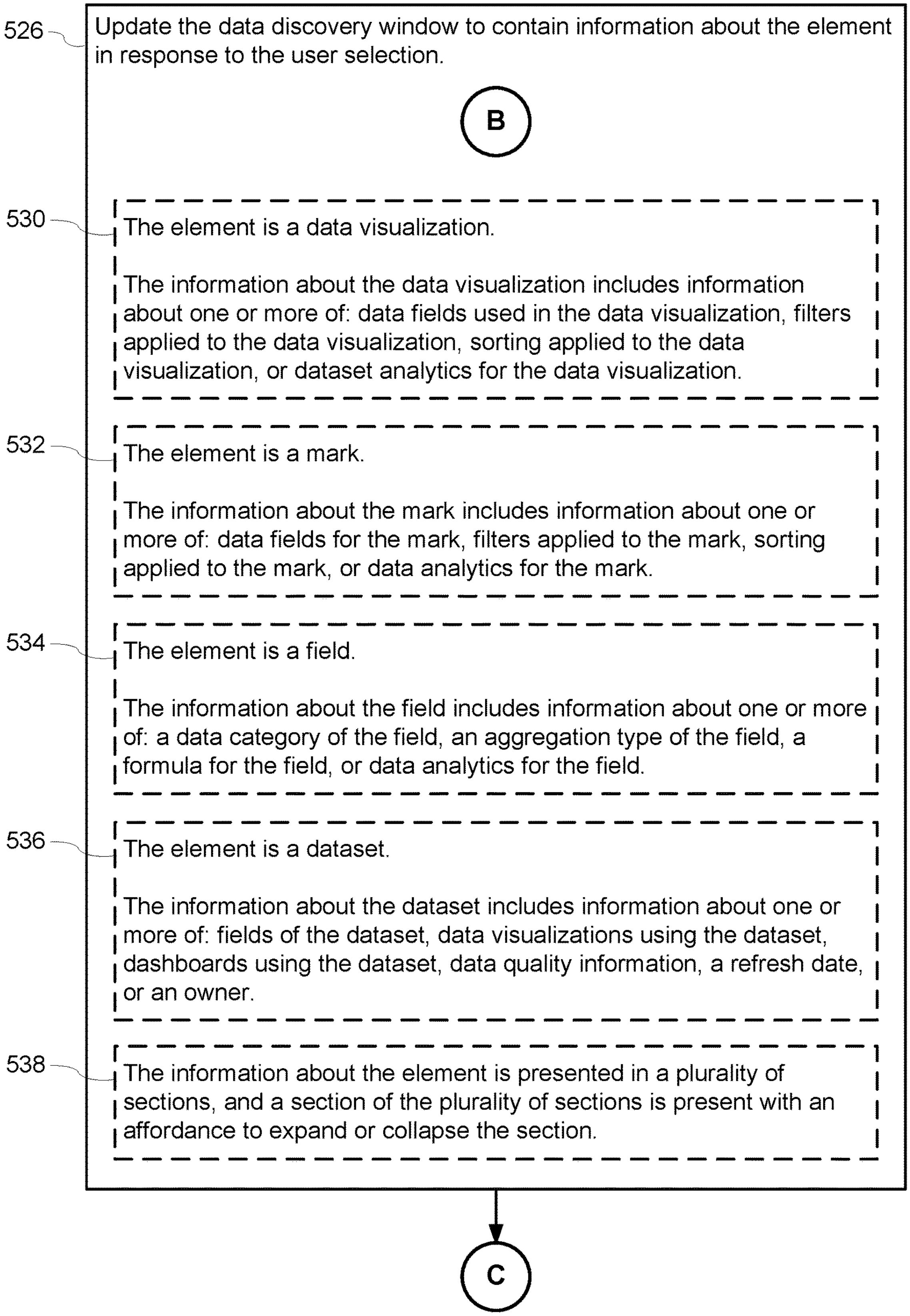
Figure 5D:
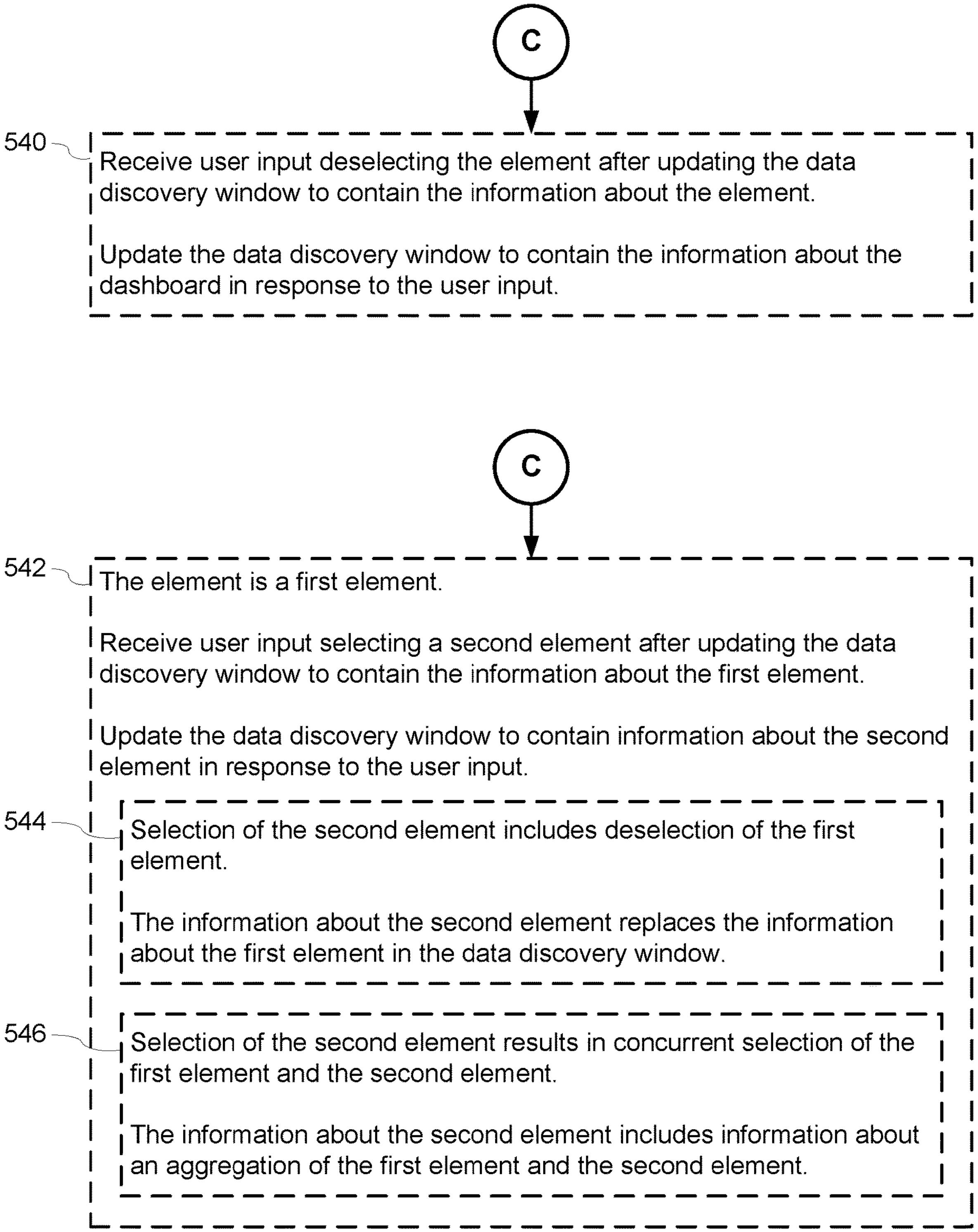
Figure 5E:
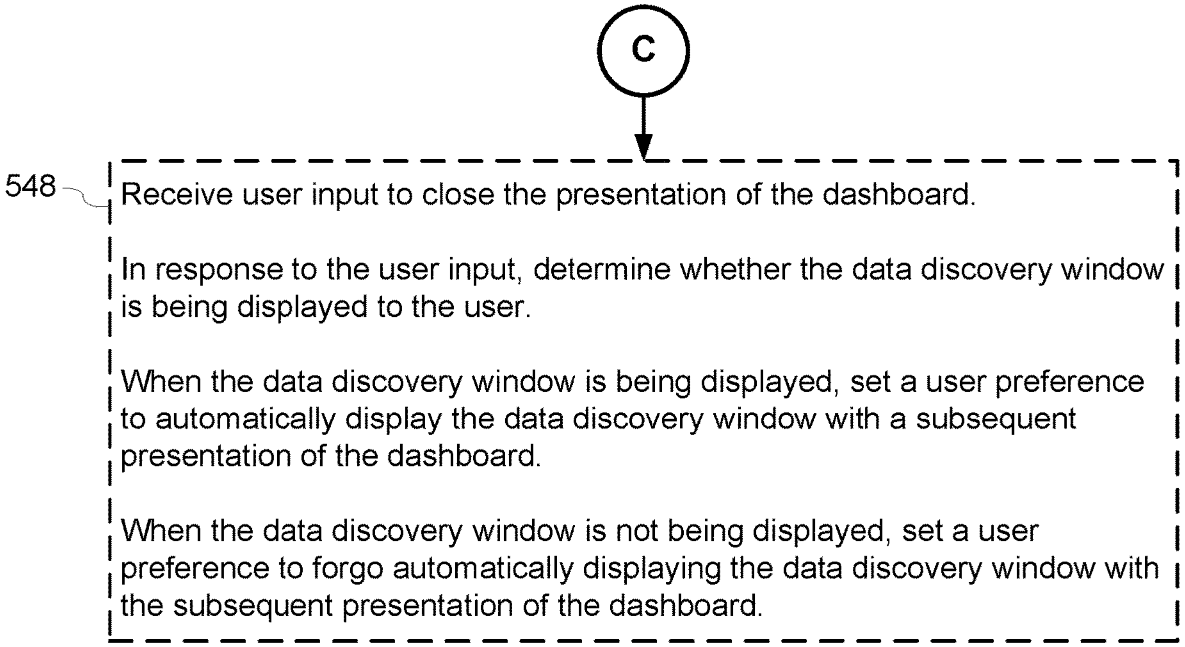

FIG. 4 is a block diagram of a computing device 400 in accordance with some implementations. FIG. 4 illustrates a computing device 400 capable of displaying the graphical user interface 100 in accordance with some implementations. Various examples of the computing device 400 include a desktop computer, a laptop computer, a tablet computer, and other computing devices that have a display and a processor capable of running a communications application 422. The computing device 400 typically includes one or more processing units/cores (CPUs) 402 for executing modules, programs, and/or instructions stored in the memory 414 and thereby performing processing operations; one or more network or other communications interfaces 404; memory 414; and one or more communication buses 412 for interconnecting these components. The communication buses 412 may include circuitry that interconnects and controls communications between system components.

The computing device 400 includes a user interface 406 comprising a display device 408 and one or more input devices or mechanisms 410. In some implementations, the input device/mechanism includes a keyboard. In some implementations, the input device/mechanism includes a "soft" keyboard, which is displayed as needed on the display device 408, enabling a user to "press keys" that appear on the display 408. In some implementations, the display 408 and input device/mechanism 410 comprise a touch screen display (also called a touch sensitive display).

In some implementations, the memory 414 includes high-speed random-access memory, such as DRAM, SRAM, DDR RAM or other random-access solid-state memory devices. In some implementations, the memory 414 includes non-volatile memory, such as one or more magnetic disk storage devices, optical disk storage devices, flash memory devices, or other non-volatile solid state storage devices. In some implementations, the memory 414 includes one or more storage devices remotely located from the CPU(s) 402. The memory 414, or alternately the non-volatile memory device(s) within the memory 414, comprises a non-transitory computer readable storage medium. In some implementations, the memory 414, or the computer readable storage medium of the memory 414, stores the following programs, modules, and data structures, or a subset thereof:

- an operating system 416, which includes procedures for handling various basic system services and for performing hardware dependent tasks;
- a communications module 418, which is used for connecting the computing device 400 to other computers and devices via the one or more communication network interfaces 404 (wired or wireless) and one or more communication networks, such as the Internet, other wide area networks, local area networks, metropolitan area networks, and so on;
- a web browser 420 (or other application capable of displaying web pages), which enables a user to communicate over a network with remote computers or devices;
- a data visualization application 422, which provides a graphical user interface 100 for a user to construct and explore visual graphics. For example, a user selects one or more data sources 450 (which may be stored on the computing device 400 or stored remotely), selects data fields from the data sources, and uses the selected fields to define a visual graphic. In some implementations, the information the user provides is stored as a visual specification 428. The data visualization application 422 includes a data visualization generation module 426, which takes the user input (e.g., the visual specification 428), and generates a corresponding visual graphic (also referred to as a "data visualization" or a "data viz"). The data visualization application 422 then displays the generated visual graphic in the user interface 100. The data visualization application 422 includes a discovery module 430, which takes information about a dashboard or workshop being displayed (and its various elements) and presents it to the user. In some implementations, the data visualization application 422 executes as a standalone application (e.g., a desktop application). In some implementations, the data visualization application 422 executes within the web browser 420 or another application using web pages provided by a web server; and one or more databases or data sources 450 (e.g., a first data source 450-1 and a second data source 450-2), which are used by the data visualization application 422. In some implementations, the data sources are stored as spreadsheet files, CSV files, XML files, or flat files, or stored in a relational database.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 414 stores a subset of the modules and data structures identified above. Furthermore, the memory 414 may store additional modules or data structures not described above.

Although FIG. 4 shows a computing device 400, FIG. 4 is intended more as a functional description of the various features that may be present rather than as a structural schematic of the implementations described herein. In practice, and as recognized by those of ordinary skill in the art, items shown separately could be combined and some items could be separated.

FIGS. 5A-5E provide a flowchart of a method 500 of data discovery in accordance with some implementations. The method 500 is performed at a computing system (e.g., the computing device 400) having a display, one or more processors, and memory. In some implementations, the memory stores one or more programs configured for execution by the one or more processors.

The computing system presents (502) a dashboard to a user. For example, FIG. 1 shows the user interface 100 with the dashboard 101. In some implementations, the dashboard is a user dashboard constructed in a data visualization application (e.g., the data visualization application 422). In some implementations, the dashboard includes one or more data visualizations generated via a data visualization generation module 426. In some implementations, the dashboard is part of a user workspace or project.

The computing system receives (504) a request from the user to display a data discovery window. For example, the user selects the data discovery affordance 102. In some implementations, the data discovery window opens with the dashboard in accordance with a user preference, e.g., the user has requested that the data discovery window open automatically when viewing the dashboard.

The computing system displays (506) the data discovery window while continuing to present the dashboard in response to the request. The data discovery window contains information about the dashboard. For example, FIG. 2A shows the discovery pane 202 displayed along with the dashboard 101.

In some implementations, the information about the dashboard includes (508) one or more of: author identification, modification date, dashboard title, project title, a number of dashboard users, and a number of dashboard views. For example, the overview section 204 in FIG. 3 includes information about the workbook, project, author, and modification date of the dashboard. Also in FIG. 3, the views section 308 includes information about the number of users and views.

In some implementations, the information about the dashboard includes (510) one or more of: a dashboard description entered by an author of the dashboard, and one or more resources linked by the author. For example, FIG. 3 shows the dashboard details section 206 including a description 302 and a linked video and linked wiki page.

In some implementations, the information about the dashboard includes (512) information about one or more of: a dataset used in the dashboard, a data sheet used in the dashboard, and a data change. For example, FIG. 3 shows the dashboard data section 212 including information about the data source and sheets used in the dashboard.

In some implementations, the system determines (514) whether a user has edit permissions for the dashboard. In accordance with a determination that the user has edit permissions for the dashboard, the system provides a first affordance within the data discovery window for the user to add or edit a description, and provides a second affordance within the data discovery window for the user to link one or more resources. In accordance with a determination that the user does not have edit permissions for the dashboard, the system forgoes providing the first affordance and the second affordance. For example, FIG. 2A shows the data discovery pane 202 for a user with edit permissions and FIG. 3 shows the data discovery pane 202 for a user without edit permissions. In some implementations, the data discovery window is (516) movable and resizable by the user.

In some implementations, the information about the dashboard includes (518) one or more of: a link to a second dashboard element, where selection of the link to the second dashboard element causes the data discovery window to update to contain information about the second dashboard element; a link to a resource document; and a link to an author page. For example, FIG. 2D shows the discovery pane 202 for the sales per customer field 233 in accordance with a user selection of the sales per customer field 233 in the data discovery pane 202 in FIG. 2C.

The system receives (520) a user selection of an element in the dashboard while displaying the data discovery window. For example, FIG. 2B shows a user selection of the customer ranking visualization 108.

In some implementations, the element is (522) one of: a data visualization, a mark, a dimension, a field, or a dataset. For example, the element is one of: the customer ranking visualization 108, the Sean Miller mark 230, the sales per customer field 233, or the superstore dataset 243.

In some implementations, the system emphasizes (524) the element within the dashboard in response to the user selection. For example, FIG. 2B shows the customer ranking visualization with a bold border in accordance with its selection. As another example, FIG. 2C shows the Sean Miller mark 230 with bold text and thicker border in accordance with its selection. In some implementations, emphasizes the element includes deemphasizes other elements, e.g., fading other elements to grey and/or reducing their size.

The system updates (526) the data discovery window to contain information about the element in response to the user selection. For example, FIG. 2B shows the data discovery pane 202 updating to contain information about customer ranking visualization 108 in accordance with its selection.

In some implementations, the information about the element includes (528) one or more of: an element description entered by an author of the dashboard, one or more resources linked by the author, information about datasets used for the element, and a hierarchy indicator for the element. For example, the visualization details section 222 in FIG. 2B includes a description field and resource links for an author to enter a text description and link audio or visual resources (e.g., a video or wiki page). As another example, the overview section 204 in FIG. 2B includes the hierarchy indicator for the customer ranking visualization 108, and the visualization data section 224 and the data summary section 226 each include information about the dataset and data for the customer ranking visualization 108.

In some implementations, the element is (530) a data visualization and the information about the data visualization includes information about one or more of: data fields used in the data visualization, filters applied to the data visualization, sorting applied to the data visualization, and dataset analytics for the data visualization.

In some implementations, the element is (532) a mark and the information about the mark includes information about one or more of: data fields for the mark, filters applied to the mark, sorting applied to the mark, and data analytics for the mark. For example, FIG. 2C shows the Sean Miller mark 230 selected and the discovery pane 202 includes the mark details section 232 and the data summary section 234.

In some implementations, the element is (534) a field and the information about the field includes information about one or more of: a data category of the field, an aggregation type of the field, a formula for the field, and data analytics for the field. For example, FIG. 2D shows the sales per customer field 233 selected and the discovery pane 202 includes the fields details section 242 and the field values section 244.

In some implementations, the element is (536) a dataset and the information about the dataset includes information about one or more of: fields of the dataset, data visualizations using the dataset, dashboards using the dataset, data quality information, a refresh date, and an owner. For example, FIG. 2E shows the superstore dataset 243 selected and the discovery pane 202 includes the dataset details section 250, the dataset fields section 252, and the usage section 246.

In some implementations, the information about the element is (538) presented in a plurality of sections, and a section of the plurality of sections is present with an affordance to expand or collapse the section. For example, FIG. 2A shows the discovery pane 202 with sections 204, 206, 212, and 214.

In some implementations, the system receives (540) a user input deselecting the element after updating the data discovery window to contain the information about the element and the system updates the data discovery window to contain the information about the dashboard in response to the user input. As an example, when the user deselects the customer ranking visualization in FIG. 2B, the discovery pane 202 reverts to the pane 202 shown in FIG. 2A.

In some implementations, the element is a first element and the system receives (542) a user input selecting a second element after updating the data discovery window to contain the information about the first element. The system updates the data discovery window to contain information about the second element in response to the user input. As an example, after selection of the customer ranking visualization 108 in FIG. 2B, the user selects the Sean Miller mark 230.

In some implementations, selection of the second element includes (544) deselection of the first element. The information about the second element replaces the information about the first element in the data discovery window. For example, FIG. 2C shows the selection of the Sean Miller mark 230 replacing selection of the customer ranking visualization 108 in FIG. 2B.

In some implementations, selection of the second element results (546) in concurrent selection of the first element and the second element. The information about the second element includes information about an aggregation of the first element and the second element. As an example, if a user selected two elements of the same type (e.g., two marks or two visualizations) then the discovery pane 202 may update to show an aggregation of information for the two elements. As another example, in accordance with the user selecting the Sean Miller mark 230 and the Tamara Chand mark 235, the discovery pane 202 updates to show information about both marks.

In some implementations, the system receives (548) a user input to close the presentation of the dashboard. In response to the user input, the system determines whether the data discovery window is being displayed to the user. In accordance with a determination that the data discovery window is being displayed, the system sets a user preference to automatically display the data discovery window with a subsequent presentation of the dashboard. In accordance with a determination that the data discovery window is not being displayed, the system sets a user preference to forgo automatically displaying the data discovery window with the subsequent presentation of the dashboard. In this way, the data visualization application saves the user preference on whether to automatically display the discovery window when displaying the dashboard.

Turning now to some example implementations.

(A1) In one aspect, some implementations include a method (e.g., the method 500) for data discovery performed at an electronic device (e.g., the computing device 400). The method includes: (i) presenting a dashboard (e.g., the dashboard 101) to a user (e.g., using the data visualization generation module 426); (ii) receiving a request from the user to display a data discovery window (e.g., via selection of the discovery affordance 102); (iii) in response to the request, displaying (e.g., using the discovery module 430) the data discovery window while continuing to present the dashboard, where the data discovery window contains information about the dashboard; (iv) while displaying the data discovery window, receiving a user selection of an element (e.g., the customer ranking visualization 108) in the dashboard; and (v) in response to the user selection, updating (e.g., via the discovery module 430) the data discovery window to contain information about the element. For example, FIG. 2A shows the discovery pane 202 displayed along with the dashboard 101 and FIG. 2B shows a user selection of the customer ranking visualization 108 and the discovery pane 202 displaying information about the customer ranking visualization. In some implementations, the data discovery window is a pane presented adjacent to the dashboard (e.g., as shown in FIG. 2A). In some implementations, the user request is a user selection of a data discovery icon (e.g., the discovery affordance 102) presented with the dashboard.

(A2) In some implementations of A1, the information about the dashboard includes one or more of: author identification, modification date, dashboard title, project title, a number of dashboard users, and a number of dashboard views. In some implementations, information includes a purpose and context of the dashboard. In some implementations, the information includes details on how different elements interact. For example, the overview section 204 in FIG. 3 includes information about the workbook, project, author, and modification date of the dashboard. Also in FIG. 3, the views section 308 includes information about the number of users and views.

(A3) In some implementations of A1 or A2, the information about the dashboard includes one or more of: a dashboard description entered by an author of the dashboard (e.g., the description 302), and one or more resources linked by the author (e.g., the dashboard video 307). In some implementations, the linked resources include one or more videos, audio recordings, documents, webpages, and the like.

(A4) In some implementations of A1-A3, the information about the dashboard includes information about one or more of: a dataset used in the dashboard, a data sheet used in the dashboard, and a data change. For example, FIG. 3 shows the dashboard data section 212 including information about the data source and sheets used in the dashboard, and the sections 304 and 214 with information about outliers and data changes.

(A5) In some implementations of A1-A4, the method further includes, in response to the user selection, emphasizing the element within the dashboard (e.g., bolding the element, highlighting the element, outlining the element, fading other elements, and the like). For example, in FIG. 2B, the customer ranking visualization 108 is selected, as denoted by the emphasis 221.

(A6) In some implementations of A1-A5, the information about the element includes one or more of: an element description entered by an author of the dashboard, one or more resources linked by the author, information about datasets used for the element, and a hierarchy indicator for the element. In some implementations, the information about the element includes an interaction map for the element (e.g., filters, gets filtered by, and etc.). In some implementations, the hierarchy indicator includes path breadcrumbs (e.g., Superstore>Customer Ranking>Sean Miller).

(A7) In some implementations of A1-A6, the element is one of: a data visualization, a mark, a dimension, a field, or a dataset. For example, the element is one of: the customer ranking visualization 108, the Sean Miller mark 230, the sales per customer field 233, or the superstore dataset 243.

(A8) In some implementations of A7, the element is a data visualization, and the information about the data visualization includes information about one or more of: data fields used in the data visualization, filters applied to the data visualization, sorting applied to the data visualization, and dataset analytics for the data visualization. In some implementations, the information for the visualization further includes legend information for the data visualization (e.g., explaining color values and other visual cues within the visualization). In some implementations, the dataset analytics include information about outliers, null data, data points used, records used, and the like (e.g., as illustrated in FIG. 2B).

(A9) In some implementations of A7, the element is a mark, and the information about the mark includes information about one or more of: data fields for the mark, filters applied to the mark, sorting applied to the mark, and data analytics for the mark. In some implementations, the data analytics include information about a rank of the mark, a number of records for the mark, null data, and the like (e.g., as illustrated in FIG. 2C).

(A10) In some implementations of A7, the element is a field, and the information about the field includes information about one or more of: a data category of the field, an aggregation type of the field, a formula for the field, and data analytics for the field. In some implementations, the data analytics include information about field values, unique value count, record count, a distribution, median, average, max, min, total, and the like (e.g., as illustrated in FIG. 2D).

(A11) In some implementations of A7, the element is a dataset, and the information about the dataset includes information about one or more of: fields of the dataset, data visualizations using the dataset, dashboards using the dataset, data quality information, a refresh date, and an owner (e.g., as illustrated in FIG. 2E).

(A12) In some implementations of A1-A11, the method further includes: (i) after updating the data discovery window to contain the information about the element, receiving a user input deselecting the element, and (ii) in response to the user input, updating the data discovery window to contain the information about the dashboard.

(A13) In some implementations of A1-A12, the element is a first element, and the method further includes: (i) after updating the data discovery window to contain the information about the first element, receiving a user input selecting a second element, and (ii) in response to the user input, updating the data discovery window to contain information about the second element.

(A14) In some implementations of A13, selection of the second element includes deselection of the first element, and the information about the second element replaces the information about the first element in the data discovery window.

(A15) In some implementations of A13, selection of the second element results in concurrent selection of the first element and the second element, and the information about the second element includes information about an aggregation of the first element and the second element (e.g., an aggregation of selected marks).

(A16) In some implementations of A1-A15, the method further includes: (i) prior to presenting the dashboard to the user, determining whether the user has edit permissions for the dashboard; (ii) in accordance with a determination that the user has edit permissions for the dashboard, providing a first affordance within the data discovery window for the user to add or edit a description, and providing a second affordance within the data discovery window for the user to link one or more resources; and (iii) in accordance with a determination that the user does not have edit permissions for the dashboard, forgoing providing the first affordance and the second affordance. For example, FIG. 2A shows the data discovery pane 202 with the description field 208 for a user with edit permissions, and FIG. 3 shows the data discovery pane 202 without the description field 208 for a user without edit permissions.

(A17) In some implementations of A1-A16, the method further includes: (i) receiving a user input to close the presentation of the dashboard; (ii) in response to the user input, determining whether the data discovery window is being displayed to the user; (iii) in accordance with a determination that the data discovery window is being displayed, setting a user preference to automatically display the data discovery window with a subsequent presentation of the dashboard; and (iv) in accordance with a determination that the data discovery window is not being displayed, setting a user preference to forgo automatically displaying the data discovery window with the subsequent presentation of the dashboard. In some implementations, the user preference information is stored in a database with the dashboard. In some implementations, the user preference information is stored in a database on the electronic device (e.g., the database 450).

(A18) In some implementations of A1-A17, the information about the element is presented in a plurality of sections, and a section of the plurality of sections is present with an affordance to expand or collapse the section. In some implementations, a user preference is set as to whether to automatically display each section as expanded or collapsed. In some implementations, the user preference is based on a state of each section when the discovery window was last viewed by the user.

(A19) In some implementations of A1-A18, the data discovery window is movable and resizable by the user. In some implementations, a user preference is set as to a display location and sizing information for the data discovery window. In some implementations, the data discovery window can be undocked and docked at various locations within the dashboard window. In some implementations, the data discovery window (e.g., the discovery pane 202) is sized based on the type of element selected, or an amount of information with the discovery window. In some implementations the data discovery window is sized based on a user preference.

(A20) In some implementations of A1-A19, the information about the dashboard includes one or more of: (i) a link to a second dashboard element, where selection of the link to the second dashboard element causes the data discovery window to update to contain information about the second dashboard element; (ii) a link to a resource document; and (iii) a link to an author page. In some implementations, the resource document opens in a new browser window or tab. In some implementations, the resource document opens using a corresponding application.

(A21) In some implementations of A1-A20, the method further includes: (i) after updating the data discovery window to contain the information about the first element, receiving a user input selecting a component of the discovery window, and (ii) in response to the user input, updating the data discovery window to contain information about the selected component. For example, in accordance with the selection of the sale per customer field 233 in FIG. 2C, the discovery pane 202 is updated to show discovery information about the sales per customer field 233 in FIG. 2D.

In another aspect, some implementations include a computing system including one or more processors and memory coupled to the one or more processors, the memory storing one or more programs configured to be executed by the one or more processors, the one or more programs including instructions for performing any of the methods described herein (e.g., method 500 or A1-A21 above).

In yet another aspect, some implementations include a non-transitory computer-readable storage medium storing one or more programs for execution by one or more processors of a computing system, the one or more programs including instructions for performing any of the methods described herein (e.g., method 500 or A1-A21 above).

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method performed at a computing device having a display, memory, and one or more processors, the method comprising:

generating and displaying, in a graphical user interface, a data dashboard that includes one or more data visualizations;

receiving a request from a user to display a data discovery window;

in response to receiving the request, displaying the data discovery window in the graphical user interface while continuing to present the data dashboard, including the one or more data visualizations, wherein the data discovery window conveys textual and numerical information about a data visualization of the data dashboard and is distinct from the data visualization;

while displaying the data discovery window, receiving user selection of a first element in the data dashboard; and in response to receiving the user selection:

in accordance with a determination that the first element has a first element type, updating the data discovery window to contain information about the first element according to the first element type.

2. The method of claim 1, wherein the information about the data dashboard includes one or more of: a dashboard description entered by an author of the data dashboard, and one or more resources linked by the author.

3. The method of claim 1, wherein the information about the data dashboard includes information about one or more of a dataset used in the data dashboard, a data sheet used in the data dashboard, and a data change.

4. The method of claim 1, wherein the information about the first element includes one or more of: an element description entered by an author of the data dashboard, one or more resources linked by the author, information about datasets used for the first element, and a hierarchy indicator for the first element.

5. The method of claim 1, wherein the first element type is one of: a data visualization, a data mark, a dimension, a data field, or a dataset.

6. The method of claim 5, wherein the first element type is a data visualization, and wherein the information about the data visualization includes information about one or more of: data fields used in the data visualization, filters applied to the data visualization, sorting applied to the data visualization, and dataset analytics for the data visualization.

7. The method of claim 5, wherein the first element type is a data mark, and wherein the information about the data mark includes information about one or more of: data fields for the data mark, filters applied to the data mark, sorting applied to the data mark, and data analytics for the data mark.

8. The method of claim 5, wherein the first element type is a data field, and wherein the information about the data field includes information about one or more of: a data category of the data field, an aggregation type of the data field, a formula for the data field, and data analytics for the data field.

9. The method of claim 5, wherein the first element type is a dataset, and wherein the information about the dataset includes information about one or more of: data fields of the dataset, data visualizations using the dataset, dashboards using the dataset, data quality information, a refresh date, and an owner.

10. The method of claim 1, further comprising:

after updating the data discovery window to contain the information about the first element, receiving user input deselecting the first element, and in response to the user input, updating the data discovery window to contain the information about the data dashboard.

11. The method of claim 1, further comprising:

after updating the data discovery window to contain the information about the first element, receiving user input selecting a second element; and in response to the user input, updating the data discovery window to contain information about the second element.

12. The method of claim 1, further comprising:

after updating the data discovery window to contain the information about the first element, receiving user input selecting a component of the data discovery window; and in response to the user input, updating the data discovery window to contain information about the selected component.

13. A computing device, comprising:

one or more processors;

memory;

a display; and one or more programs stored in the memory and configured for execution by the one or more processors, the one or more programs comprising instructions for:

generating and displaying, in a graphical user interface, a data dashboard that includes one or more data visualizations;

receiving a request from a user to display a data discovery window;

in response to receiving the request, displaying the data discovery window in the graphical user interface while continuing to present the data dashboard, including the one or more data visualizations, wherein the data discovery window conveys textual and numerical information about a data visualization of the data dashboard and is distinct from the data visualization;

while displaying the data discovery window, receiving user selection of a first element in the data dashboard; and in response to receiving the user selection:

in accordance with a determination that the first element has a first element type, updating the data discovery window to contain information about the first element according to the first element type.

14. The computing device of claim 13, wherein the information about the data dashboard includes one or more of a dashboard description entered by an author of the data dashboard, and one or more resources linked by the author.

15. The computing device of claim 13, wherein the information about the data dashboard includes information about one or more of a dataset used in the data dashboard, a data sheet used in the data dashboard, and a data change.

16. The computing device of claim 13, wherein the information about the first element includes one or more of: an element description entered by an author of the data dashboard, one or more resources linked by the author, information about datasets used for the first element, and a hierarchy indicator for the first element.

17. A non-transitory computer-readable storage medium storing one or more programs configured for execution by a computing device having one or more processors, memory, and a display, the one or more programs comprising instructions for:

generating and displaying, in a graphical user interface, a data dashboard that includes one or more data visualizations;

receiving a request from a user to display a data discovery window;

in response to the request, displaying the data discovery window in the graphical user interface while continuing to present the data dashboard, including the one or more data visualizations, wherein the data discovery window conveys textual and numerical information about a data visualization of the data dashboard and is distinct from the data visualization;

while displaying the data discovery window, receiving user selection of a first element in the data dashboard; and in response to the user selection:

in accordance with a determination that the first element has a first element type, updating the data discovery window to contain information about the first element according to the first element type.

18. The non-transitory computer-readable storage medium of claim 17, wherein the information about the data dashboard includes one or more of: a dashboard description entered by an author of the data dashboard, and one or more resources linked by the author.

19. The non-transitory computer-readable storage medium of claim 17, wherein the information about the data dashboard includes information about one or more of: a dataset used in the data dashboard, a data sheet used in the data dashboard, and a data change.

20. The non-transitory computer-readable storage medium of claim 17, wherein the information about the first element includes one or more of: an element description entered by an author of the data dashboard, one or more resources linked by the author, information about datasets used for the first element, and a hierarchy indicator for the first element.

* * * * *